(12) United States Patent
Hunt et al.

(10) Patent No.: US 12,376,522 B2
(45) Date of Patent: Aug. 5, 2025

(54) HARVESTER HEADER HAVING A SEGMENT CONTROL SYSTEM

(71) Applicant: CNH Industrial America LLC, New Holland, PA (US)

(72) Inventors: Cory D. Hunt, Millersville, PA (US); Glenn Aesaert, Izegem (BE); Jeffrey C. Trowbridge, Stevens, PA (US)

( * ) Notice: Subject to any disclaimer, the term of this patent is extended or adjusted under 35 U.S.C. 154(b) by 923 days.

(21) Appl. No.: 17/293,952

(22) PCT Filed: Nov. 12, 2019

(86) PCT No.: PCT/US2019/060927
§ 371 (c)(1),
(2) Date: May 14, 2021

(87) PCT Pub. No.: WO2020/102199
PCT Pub. Date: May 22, 2020

(65) Prior Publication Data
US 2022/0007576 A1     Jan. 13, 2022

Related U.S. Application Data

(60) Provisional application No. 62/768,614, filed on Nov. 16, 2018.

(51) Int. Cl.
*A01D 41/14*     (2006.01)
*A01D 34/28*     (2006.01)
(Continued)

(52) U.S. Cl.
CPC ......... *A01D 41/141* (2013.01); *A01D 41/145* (2013.01)

(58) Field of Classification Search
CPC .. A01D 41/141; A01D 41/145; A01D 34/286; A01D 34/28; F15B 11/04; F15B 11/05
See application file for complete search history.

(56) References Cited

U.S. PATENT DOCUMENTS 2,842,407 A * 7/1958 Davis ...................... B05B 7/144
                                                          406/52
3,087,819 A * 4/1963 Harris .................... A23K 20/24
                                                         426/321
(Continued)

FOREIGN PATENT DOCUMENTS

BR           9301230 A * 9/1993 ............ F15B 11/044
BR   PI0708050 A2 * 5/2011
(Continued)

OTHER PUBLICATIONS

International Search Report for PCT application PCT/US2019/060927, mailed Apr. 24, 2020 (14 pages).

*Primary Examiner* — Matthew Troutman
*Assistant Examiner* — Ashley A Kaercher
(74) *Attorney, Agent, or Firm* — Rebecca Henkel; Rickard K. DeMille; Peter K. Zacharias

(57) ABSTRACT

A header of a harvester includes a header segment, a center section, an actuator coupling the header segment to the center section, and a controller. The header segment includes a cutter bar configured to cut crops and the header segment includes a first portion of a conveyor assembly. The center section includes a second portion of the conveyor assembly, in which the center section is configured to receive crops from the header segment via the first portion of the conveyor assembly, and the second portion of the conveyor assembly is configured to transport the received crops to a crop processing system of the harvester. The controller is configured to receive a signal indicative of a target position of the header segment and the controller is configured to control the actuator to adjust the header segment to the target position.

17 Claims, 7 Drawing Sheets

(51) Int. Cl.
*F15B 11/04* (2006.01)
*F15B 11/05* (2006.01)

(56) References Cited

U.S. PATENT DOCUMENTS

| | | | | |
|---|---|---|---|---|
| 3,417,555 | A * | 12/1968 | Watkins | A01D 41/141 56/DIG. 15 |
| 3,498,037 | A * | 3/1970 | Garrison | A01D 41/141 137/413 |
| 3,568,420 | A * | 3/1971 | Hofer | A01D 41/145 56/208 |
| 3,605,391 | A * | 9/1971 | Schott et al. | A01D 41/141 56/DIG. 15 |
| 3,953,959 | A * | 5/1976 | Decruyenaere | A01D 41/145 56/208 |
| 4,184,314 | A * | 1/1980 | Hobbs | A01D 29/00 56/364 |
| 4,594,840 | A * | 6/1986 | D'Almeida | A01D 41/141 56/11.2 |
| 5,687,798 | A * | 11/1997 | Henry | A01C 7/205 172/321 |
| 8,833,481 | B2 | 9/2014 | Blunier | A01B 63/008 701/50 |
| 9,198,343 | B2 * | 12/2015 | Mariman | A01C 21/00 |
| 9,832,921 | B2 * | 12/2017 | Anderson | A01B 73/04 |
| 11,533,851 | B2 * | 12/2022 | Hunt | A01D 75/00 |
| 2003/0089093 | A1 * | 5/2003 | Paquet | A01D 41/141 56/10.2 A |
| 2003/0184747 | A1 * | 10/2003 | Diekhans | A01D 41/141 342/123 |
| 2007/0204582 | A1 * | 9/2007 | Coers | A01D 41/141 56/10.2 E |
| 2015/0013795 | A1 * | 1/2015 | Ritter | A01D 41/145 137/596.16 |
| 2015/0305239 | A1 * | 10/2015 | Jung | A01D 41/141 701/50 |
| 2016/0106037 | A1 * | 4/2016 | Lee | A01D 41/145 56/208 |
| 2016/0113200 | A1 * | 4/2016 | Gofron | A01D 41/141 701/50 |
| 2018/0070531 | A1 * | 3/2018 | Long | A01D 41/145 |
| 2018/0098491 | A1 * | 4/2018 | Long | A01D 34/006 |
| 2018/0153102 | A1 * | 6/2018 | Dunn | A01B 63/108 |
| 2018/0255706 | A1 * | 9/2018 | Smith | A01D 41/14 |
| 2018/0271016 | A1 * | 9/2018 | Milano | A01D 33/14 |
| 2019/0230857 | A1 * | 8/2019 | Thomson | A01D 41/141 |
| 2019/0297775 | A1 * | 10/2019 | Fuechtling | A01D 34/04 |
| 2019/0307070 | A1 * | 10/2019 | Dima | A01D 57/04 |
| 2020/0326674 | A1 * | 10/2020 | Palla | A01D 41/141 |
| 2020/0390035 | A1 * | 12/2020 | Hunt | A01D 41/141 |
| 2021/0120740 | A1 * | 4/2021 | Martin | A01D 57/04 |
| 2021/0185877 | A1 * | 6/2021 | Hunt | A01B 63/002 |
| 2021/0185880 | A1 * | 6/2021 | Martin | A01D 41/145 |
| 2021/0185916 | A1 * | 6/2021 | Hunt | A01D 75/18 |
| 2021/0185917 | A1 * | 6/2021 | Hunt | A01D 41/141 |
| 2021/0185918 | A1 * | 6/2021 | Hunt | A01D 41/144 |
| 2021/0185919 | A1 * | 6/2021 | Hunt | A01D 41/127 |
| 2021/0212248 | A1 * | 7/2021 | Kong | A01D 41/144 |
| 2021/0289703 | A1 * | 9/2021 | Hunt | A01D 41/141 |
| 2021/0400873 | A1 * | 12/2021 | Kemmerer | A01D 41/14 |
| 2022/0000031 | A1 * | 1/2022 | Kemmerer | A01D 41/14 |
| 2022/0007575 | A1 * | 1/2022 | Farley | A01D 41/145 |
| 2022/0007576 | A1 * | 1/2022 | Hunt | A01D 41/145 |
| 2022/0030767 | A1 * | 2/2022 | Cook | A01D 34/246 |
| 2022/0264798 | A1 * | 8/2022 | Martin | A01D 41/141 |
| 2022/0354056 | A1 * | 11/2022 | Hunt | A01D 41/145 |
| 2022/0369557 | A1 * | 11/2022 | Hunt | G01C 21/16 |
| 2022/0394927 | A1 * | 12/2022 | Seiders, Jr. | A01D 41/127 |
| 2022/0394928 | A1 * | 12/2022 | Seiders, Jr. | A01D 41/145 |
| 2023/0023116 | A1 * | 1/2023 | Hunt | G01C 7/04 |
| 2023/0062392 | A1 * | 3/2023 | Brokaw | A01D 41/141 |
| 2023/0143706 | A1 * | 5/2023 | Cook | A01D 34/04 56/257 |
| 2023/0146866 | A1 * | 5/2023 | Martin | A01D 41/141 56/10.2 R |

FOREIGN PATENT DOCUMENTS

| | | | | |
|---|---|---|---|---|
| BR | 102022003747 | A2 * | 11/2022 | A01D 41/141 |
| BR | 102022009724 | A2 * | 11/2022 | A01D 41/1274 |
| CA | 2665589 | | 11/2010 | |
| CA | 2665589 | A1 * | 11/2010 | A01D 41/141 |
| CA | 2774535 | A1 * | 11/2012 | A01D 41/141 |
| CA | 2823199 | A1 * | 2/2014 | A01D 41/127 |
| CA | 2997798 | A1 * | 9/2018 | A01D 34/04 |
| CA | 3062915 | A1 * | 7/2020 | A01B 59/064 |
| CA | 3126093 | A1 * | 7/2020 | A01D 41/144 |
| CN | 106233921 | A * | 12/2016 | A01D 41/141 |
| CN | 111903317 | A | 11/2020 | |
| CN | 114631426 | A * | 6/2022 | |
| CN | 114766185 | A * | 7/2022 | A01D 41/127 |
| CN | 116616037 | A * | 8/2023 | |
| DE | 2838696 | A * | 3/1979 | F15B 11/05 |
| DE | 102020204861 | A1 * | 10/2020 | A01D 34/04 |
| DE | 102021105738 | A1 * | 9/2022 | A01D 41/14 |
| EP | 0404956 | A1 * | 2/1991 | |
| EP | 2842407 | A1 * | 3/2015 | A01D 41/14 |
| EP | 3066910 | A1 * | 9/2016 | A01B 73/06 |
| EP | 3087819 | A2 * | 11/2016 | A01D 41/127 |
| EP | 3225854 | A1 * | 10/2017 | |
| EP | 3420797 | A1 * | 1/2019 | A01D 34/008 |
| EP | 3456174 | A1 * | 3/2019 | A01B 63/008 |
| EP | 3741200 | A1 * | 11/2020 | A01D 41/141 |
| EP | 3782453 | A1 * | 2/2021 | A01B 63/008 |
| EP | 3811762 | A1 * | 4/2021 | A01B 63/008 |
| EP | 4062739 | A1 * | 9/2022 | A01D 41/06 |
| EP | 3879958 | B1 * | 12/2022 | A01B 63/10 |
| EP | 4081019 | B1 * | 9/2023 | A01B 63/002 |
| EP | 3879954 | B1 * | 12/2023 | A01D 41/14 |
| WO | WO-2008006730 | A1 * | 1/2008 | A01D 41/145 |
| WO | WO-2012142555 | A1 * | 10/2012 | A01D 41/141 |
| WO | WO-2015143550 | A1 * | 10/2015 | A01D 41/141 |
| WO | WO-2019111069 | A1 * | 6/2019 | A01D 41/141 |
| WO | WO-2020014689 | A1 * | 1/2020 | A01B 63/1112 |
| WO | WO-2020101887 | A1 * | 5/2020 | A01D 41/14 |
| WO | WO-2020102209 | A1 * | 5/2020 | A01D 41/127 |
| WO | WO-2021133562 | A1 * | 7/2021 | A01B 63/008 |
| WO | WO-2021133565 | A2 * | 7/2021 | A01D 41/127 |
| WO | WO-2021188501 | A1 * | 9/2021 | A01D 41/127 |
| WO | WO-2023230079 | A1 * | 11/2023 | |

* cited by examiner ions in which the hydraulic system is configured to

HARVESTER HEADER HAVING A SEGMENT CONTROL SYSTEM

BACKGROUND

The disclosure relates generally to control of a harvester. More specifically, the present disclosure relates to a system for position control of a segment of a harvester header.

A harvester may be used to harvest agricultural crops, such as barley, beans, beets, carrots, corn, cotton, flax, oats, potatoes, rye, soybeans, wheat, or other plant crops. Moreover, a harvester (e.g., combine harvester) is a type of harvester generally used to harvest certain crops that include grain (e.g., barley, corn, flax, oats, rye, wheat, etc.). During operation of a harvester, the harvesting process may begin by removing a plant from a field, such as by using a header. The header may cut the agricultural crops and transport the cut crops to a processing system of the harvester.

Generally, the harvester may be driven through a field to collect and process crops. As the harvester encounters agricultural crops in the field, the header, which is positioned at a front of the harvester, cuts a portion of each crop. Certain components of the harvester, such as the header, may be adjustable to enhance performance of the harvester. For example, the header may cut crops encompassed within a spanned width of the header. In certain harvesters, the header may be separated into header segments, in which each header segment is configured to cut a portion of the crops encompassed by the width of the harvester. The header segments may also be configured to move (e.g., rotate) independently of one another to different positions, such as to enable the header to follow the contours of a field while certain segments are in contact with the field via sensors (e.g., pressure sensors, distance sensors, angle sensors, proximity sensors). Unfortunately, when operating the header in a raised position, the segments may not be in contact with the field and as a result, are unable to follow the contour of the field to adjust their respective positions.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, a header of a harvester, includes a header segment, a center section, an actuator coupling the header segment to the center section, and a controller. The header segment includes a cutter bar configured to cut crops and the header segment includes a first portion of a conveyor assembly. The center section includes a second portion of the conveyor assembly, in which the center section is configured to receive crops from the header segment via the first portion of the conveyor assembly, and the second portion of the conveyor assembly is configured to transport the received crops to a crop processing system of the harvester. The controller is configured to receive a signal indicative of a target position of the header segment relative to the center section and/or the ground and the controller is configured to control the actuator to adjust the header segment to the target position.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE DRAWINGS

Figure 1:
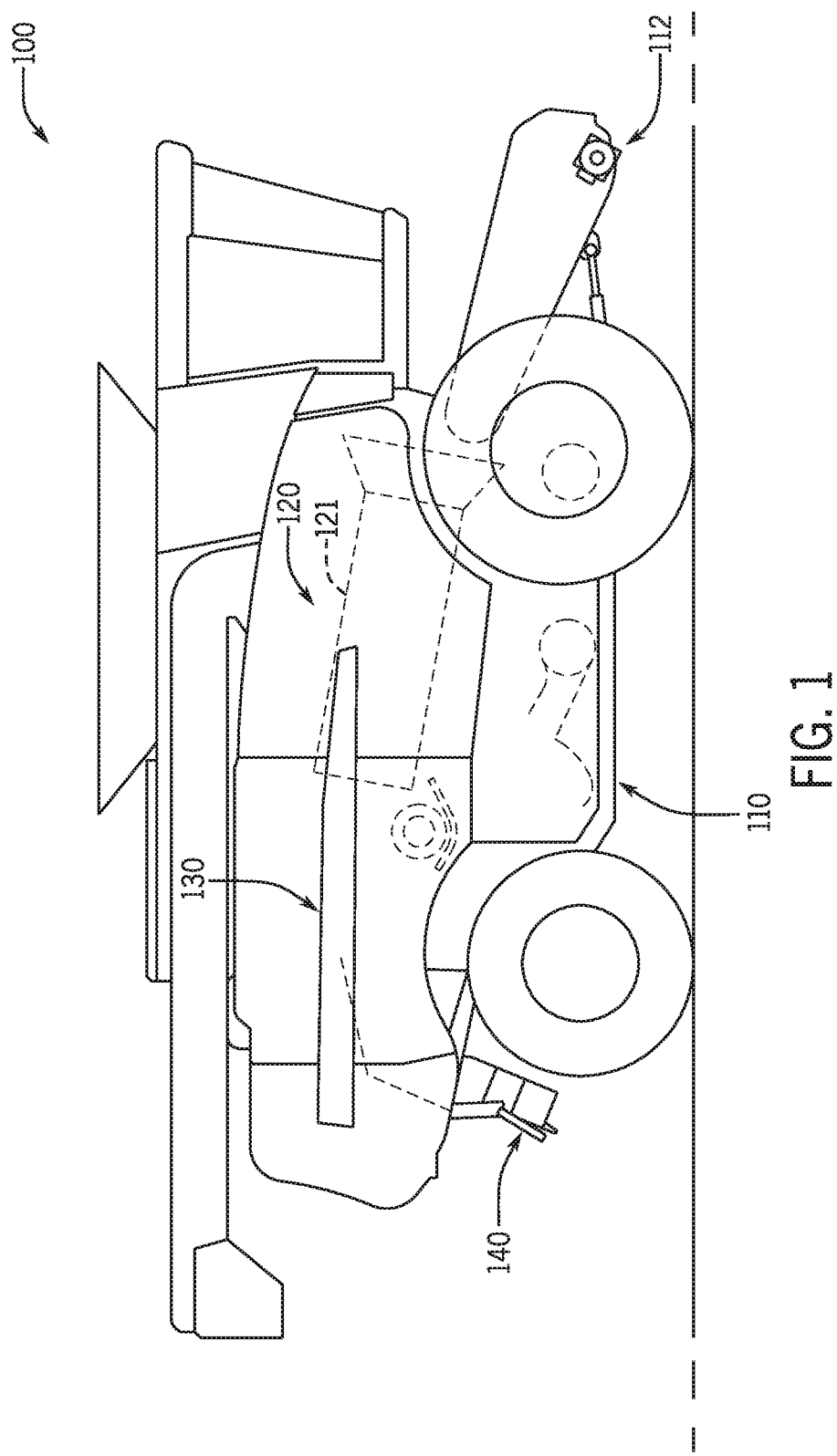
FIG. 1 is a side view of an embodiment of a harvester having a header, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The process of farming typically begins with planting seeds within a field. Over time, the seeds grow and eventually become harvestable crops. Typically, only a portion of each crop is commercially valuable, so each crop is harvested to separate the usable material from the remainder of the crop. For example, a harvester may cut agricultural crops within a field via a header. The header may also gather the cut agricultural crops into a processing system of the harvester for further processing. The processing system may include a threshing machine configured to thresh the agricultural crops, thereby separating the crops into certain desired agricultural materials, such as grain, and material other than grain (MOG). The desired agricultural materials may be sifted and then accumulated into a tank. When the tank fills to capacity, the materials may be collected from the tank. The MOG may be discarded from the harvester (e.g., via a spreader).

The header may cut crops from the field that are encompassed within the width of the header. The header may include a cutter bar assembly that extends a portion of the width of the header, and the cutter bar assembly may use blades to cut the crops. The cut crops may fall onto the header, and the cut crops may be gathered together, such as via conveyors that run across the header. The gathered agricultural crops may then be transported into the processing system of the harvester.

The cutter bar assembly may be flexible, such as to conform to a contour of the ground while the cutter bar assembly is in contact with the ground. Certain harvesters include headers that include header segments configured to move independently from one another. For example, the cutter bar assembly may extend across the header segments. While the cutter bar assembly is operated such that the header segments are in contact with the field, the header segments may enable the cutter bar assembly to flex in response to contours of the field. Additionally, while the cutter bar assembly is raised, in which the header segments are not in contact with the field, the position of the header segments may be controlled, such as to control the contour of the cutter bar assembly to match the contour of the ground substantially and maintain a substantially constant cutting height across the cutter bar assembly.

Thus, in accordance with certain embodiments of this disclosure, controlling the respective positions of the header segments may provide advantages for a harvester header. For example, a harvester controller may receive an input, such as from an operator of the harvester, that a header segment is to be adjusted to a target position. In response, the harvester controller may compare a current position of the header segment to the target position and instruct an actuator to adjust the header segment toward the target position. When the header segment is adjusted to the target position, the position of the header segment may be maintained until the harvester controller receives another input that the header segment is to be adjusted to a different target position. The header segments may be adjusted to different positions independently of one another. The header segments may be adjusted by a variety of methods. Although this disclosure primarily discusses use of a hydraulic system, the adjustment of the header segments may be performed by other systems, such as an electromechanical system, a pneumatic system, any other suitable system, or any combination thereof. Further, as used herein, a harvester includes any variation of a harvester, including a combine harvester, that may use a header for harvesting.

Turning now to the drawings, FIG. 1 is a side view of a harvester 100 having a header. The harvester 100 includes a chassis 110 that supports harvesting apparatus to facilitate harvesting crops. As described in greater detail below, the header 112 (e.g., small grain header) that cuts crops and directs the cut crops toward an inlet of a crop processing system 120 of the harvester 100 for further processing of the cut crops. The crop processing system 120 receives cut crops from the header 112. As an example, the crop processing system 120 includes a thresher 121 that conveys a flow of crops through the crop processing system 120. In some embodiments, the thresher 121 includes a cylindrical threshing rotor that transports the crops in a helical flow path. In addition to transporting the crops, the thresher 121 may also separate certain desired crop material (e.g., grain) from residue (e.g., MOG), such as husk and pods, and direct the residue into a cleaning system located beneath the thresher 121. The residue may be transported to a crop residue handling system 130, which may hold the crop residue for further processing and/or expel the crop residue from the harvester 100 via a crop residue spreading system 140 positioned at the aft end of the harvester 100.

Figure 2:
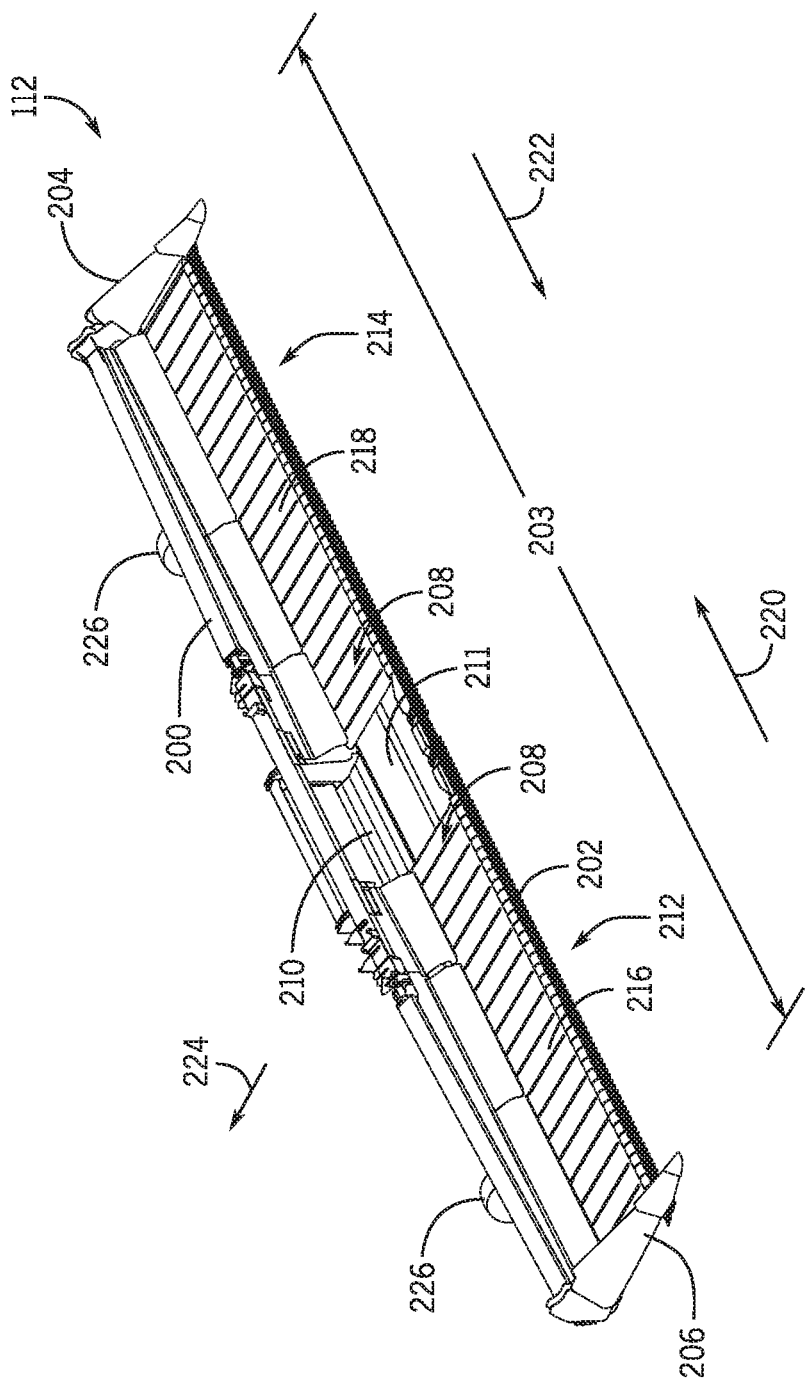
FIG. 2 is a perspective view of an embodiment of a header (e.g., small grain header) that may be employed within the harvester of FIG. 1, in accordance with an aspect of the present disclosure.

FIG. 2 is a perspective view of an embodiment of a header 112 that may be used by the harvester of FIG. 1. It should be noted that not all components of the header 112 are shown (e.g., reel, reel arms, infeed auger, etc.). The header 112 includes a frame 200 that may be removably coupled to a frame of the harvester 100. The header 112 also includes a cutter bar assembly 202 that extends across a width 203 of the frame 200 between side portions 204, 206 of the frame 200. When the harvester 100 is in operation, blades of the cutter bar assembly 202 engage and cut the crops. The portions of the crops that are cut may be directed onto a conveyor assembly 208 of the header 112 by a reel assembly. In general, the conveyor assembly 208 is configured to transport cut crops toward an inlet 210 and toward the crop processing system 120.

In the illustrated embodiment, the header 112 includes a center section 211, as well as a first header segment 212 and a second header segment 214 that are each pivotally coupled to opposite ends of the center section 211. The first header segment 212 and the second header segment 214 are independently adjustable. In other words, a position of the first header segment 212 is adjustable independent of a position of the second header segment 214. Likewise, a position of the second header segment 214 is adjustable independent of a position of the first header segment 212.

The cutter bar assembly 202 of the header 112 is flexible to enable the cutter bar assembly 202 to bend in response to adjustment of the first header segment 212 and/or adjustment of the second header segment 214. The cutter bar assembly 202 extends along the center section 211, the first header segment 212, and the second header segment 214. The first header segment 212 includes a first conveyor section 216 of the conveyor assembly 208, and the second header segment 214 includes a second conveyor section 218 of the conveyor assembly 208. The first conveyor section 216 extends a portion of the width 203 of the header 112, and the second conveyor section 218 extends another portion of the width 203 of the header 112. The first conveyor section 216 may direct the crops in a first direction 220 toward the center section 211 and the second conveyor section 218 may direct the crops in a second direction 222 towards the center section 211. The center section 211 may then direct the crops to the inlet 210 in a third direction 224 via another conveyor section of the conveyor assembly 208 toward the crop processing system 120. In certain embodiments, the third direction 224 may be transverse to the first direction 220 and the second direction 222.

The header 112 may include wheels 226 to facilitate movement of the header 112 when the harvester 100 is in operation. The wheels 226 may engage with the ground to control the header height. For example, the wheels 226 may be positioned to control a height of the cutter bar assembly 202 with respect to the ground to control where crops are cut. Specifically, the wheels 226 may enable the cutter bar assembly 202 to contact the ground, in which the position of the header segments 212, 214 adjust to follow the contour of the ground. The wheels 226 may additionally or alternatively be retracted such that the header 112 is in a raised position. In the raised position of the header 112, the cutter bar assembly 202 may not be in contact with the ground and instead, may be a distance (i.e., a cutting height) above the ground. Thus, the position of the header segments 212, 214 may be independently controlled to match the contour of the cutter bar assembly 202 with the contour of the ground and maintain a substantially constant cutting height across the width 203 of the cutter bar assembly 202.

Figure 3:
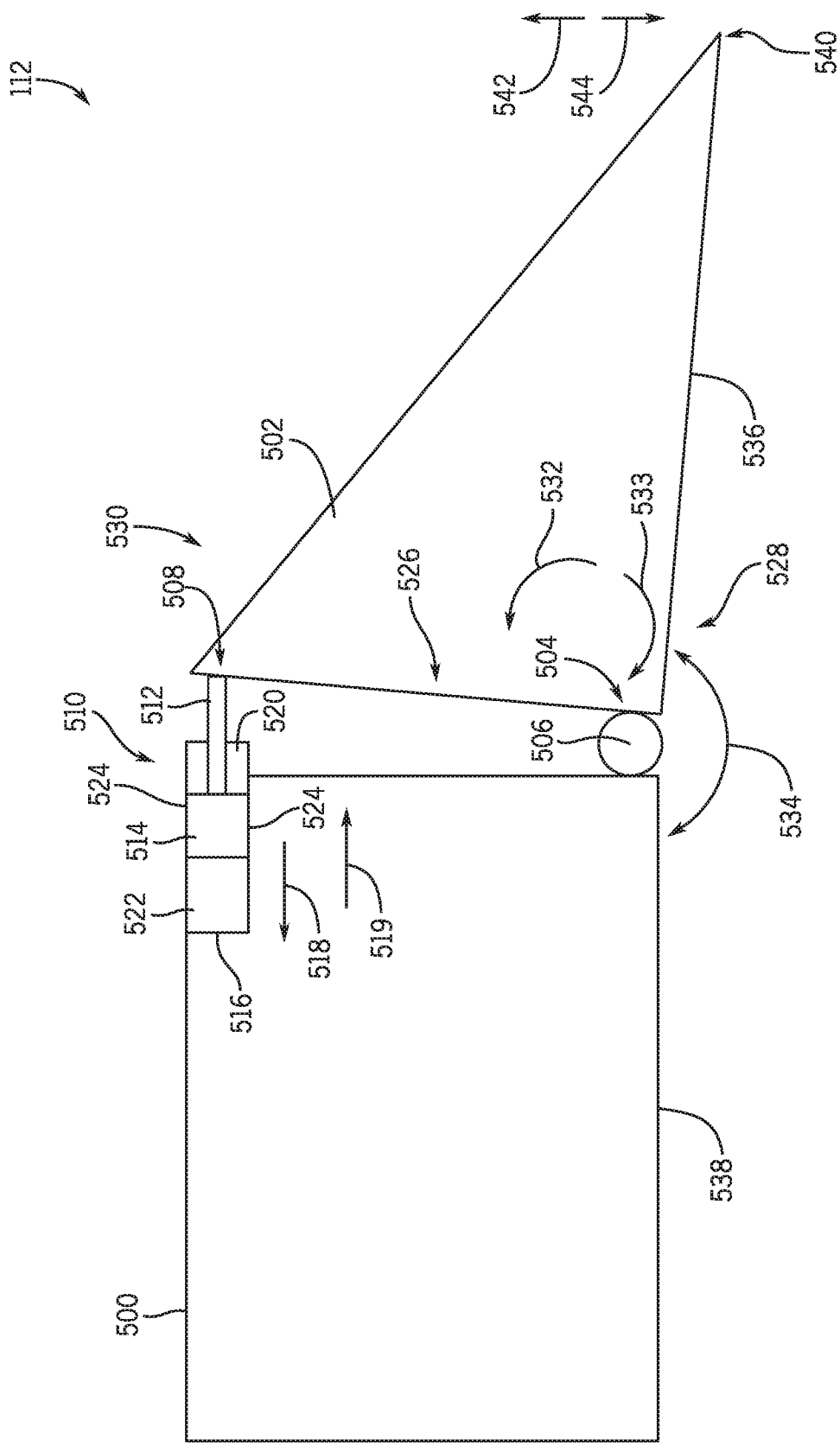
FIG. 3 is a schematic view of an embodiment of a position of a header (e.g., the header of FIG. 2) with a header segment in a lowered position, in accordance with an aspect of the present disclosure.

FIG. 3 is a schematic view of an embodiment of a portion of a header (e.g., the header 112 of FIG. 2), in which a header segment is in a lowered position. As shown, the header 112 includes a center section 500 and a header segment 502 (e.g., the first header segment or the second header segment of FIG. 2). The center section 500 is configured to receive crops from the header segment 502 (e.g., from the conveyor assembly of the header segment 502) and to direct the crops to the inlet 210. The position (e.g., orientation) of the header segment 502 is adjustable relative to the center section 500. The header segment 502 is rotatably coupled to the center section 500 at a first location 504 via a pivot 506. At a second location 508, the header segment 502 is coupled to a lift cylinder 510 configured to adjust a position (e.g., orientation) of the header segment 502. As illustrated, the header segment 502 is coupled to a rod 512 of the lift cylinder 510. The rod 512 is coupled to a piston 514 disposed within a body 516 of the lift cylinder 510. The piston 514 is configured to move in a first piston direction 518 and a second piston direction 519 within the body 516, such as via a pressure differential between a first section 520 (i.e., the side of the piston 514 where the rod 512 is coupled to the piston 514) of the body 516 and a second section 522 (i.e., the side of the piston 514 without the rod 512) of the body 516. Accordingly, a difference between a pressure in the first section 520 and a pressure in the second section 522 may drive the piston 514 to move the rod 508, thereby adjusting the header segment 502. To block fluid flow around the piston, seals 524 are disposed around the piston 514. The seals 524 maintain a desired pressure differential between the first section 520 and the second section 522. As such, fluid pressure may be applied to either the first section 520 or the second section 522 of the piston 514 to create a desired pressure differential to drive the piston 514 into a desired position within the body 516.

As illustrated, the first location 504 and the second location 508 are each disposed on an inner side 526 of the header segment 502. However, the first location 504 is disposed at a first end 528 of the inner side 526, opposite a second end 530 of the inner side 526 where the second location 508 is disposed. As a result, when the piston 514 moves within the body 516, the rod 512 drives the second end 530 to move generally in the first piston direction 518 or the second piston direction 519. However, since the first end 528 is rotatably coupled to the pivot 506, the header segment 502 rotates in a first rotational direction 532 or a second rotational direction 533 about the pivot 506 in response to movement of the second end 530. In this manner, as the piston 514 is moved within the body 516, an angle 534 between a bottom side 536 of the header segment 502 and a bottom side 538 of the center section 500 is adjusted. Further, a position of an outer end 540 of the header segment (e.g., a third end) is adjusted, such as in a first vertical direction 542 and a second vertical direction 544. As described in this disclosure, when the piston 514 is moved in the first piston direction 518, the header segment 502 rotates in the first rotational direction 532 and the outer end 540 is moved in the first vertical direction 542 (i.e., the angle 534 increases) to raise the header segment 502. Furthermore, when the piston 514 is moved in the second piston direction 519, the header segment 502 rotates in the second rotational direction 533 and the outer end 540 is moved in the second vertical direction 544 (i.e., the angle 534 is decreases) to lower the header segment 502. Since the outer end 540 is lower than the bottom side 538 of the center section 500, as shown in FIG. 3, the header segment 502 is considered to be in a lowered position.

Figure 4:
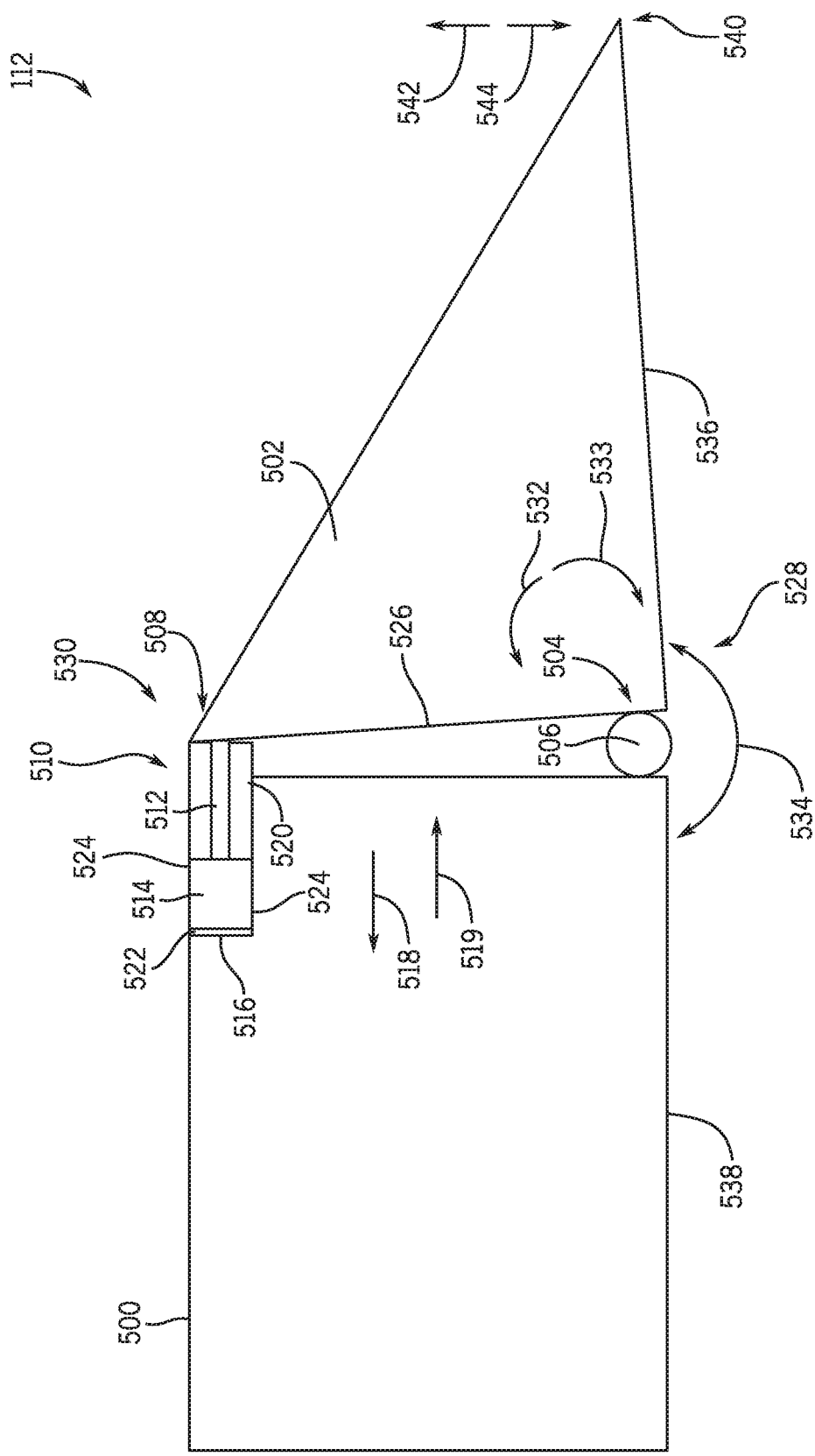
FIG. 4 is a schematic view of the position of the header of FIG. 3 with the header segment in a raised position, in accordance with an aspect of the present disclosure.

FIG. 4 is a schematic view of the portion of the header of FIG. 3 with the header segment 502 in a raised position. As illustrated, the outer end 540 of the header segment 502 is raised above the bottom side 538. Additionally, as illustrated in FIG. 4, the piston 514 is moved in the first piston direction 518 to retract the rod 512. As a result, the second location 508 is moved in the first piston direction 518 and the header segment 502 is rotated in the first rotational direction 532 to raise the outer end 540 in the first vertical direction 542.

In certain embodiments, incompressible fluid (e.g., a liquid) may be used to move the piston 514. A certain amount of the fluid may be disposed in the first section 520 and in the second section 522 of the lift cylinder 510, and each section 520, 522 may be connected to a fluid reservoir. When the forces caused by the fluid pressure in the first section 520 and the forces caused by the fluid pressure in the second section 522 are equal, the piston 514 may not move, since the equal forces counteract against one another. To move the piston 514 in the first piston direction 518, the pressure in the first section 520 may be increased, and the increased pressure exerts a force against the piston 514 to move the piston 514 in the first piston direction 518. As the piston 514 moves in the first piston direction 518, fluid from the second section 522 is transferred into the fluid reservoir connected to the second section 522. Similarly, fluid may be removed from the first section 520 to the fluid reservoir connected to the first section 520 to decrease forces caused by the fluid pressure in the first section 520. For example, gravitational forces may drive the piston 514 in the second piston direction 519 and remove fluid from the first section 520. Additionally or alternatively, fluid may be added to the second section 522 to increase the forces caused by the fluid pressure in the second section 522. When the force against the piston 514 in the first section 520 falls below the force against the piston in the second section 522, the piston may move in the second piston direction 519 opposite the first piston direction 518 and as a result, fluid from the fluid reservoir connected to the second section 522 may flow into the second section 522. In this manner, an amount of fluid may be added and/or removed from the first section 520 and/or the second section 522 to control movement of the piston 514 and thus, position adjustment of the header segment 502.

The header 112 depicted in FIGS. 3 and 4 may include other suitable arrangements. For example, although FIGS. 3 and 4 depict a single header segment 502 is coupled to the center section 500 in the illustrated embodiments, additional or alternative embodiments of the header may include any suitable number of header segments coupled to the center section. Moreover, a header segment may be coupled to the center section in a different manner, such as at a different part of the center section. One header segment may also be coupled to another header segment, rather than the center section, and each header segment may be controlled independently. Furthermore, the shape of each component may be different than that illustrated in FIGS. 3 and 4. By way of example, a header segment may be rectangular and/or each header segment may have a different shape. In further embodiments, raising and lowering the header segment may be driven by moving the piston in the opposite directions as shown in FIGS. 3 and 4. For example, moving the piston in the first piston direction 518 may lower the header segment while moving the piston in the second piston direction 519 may raise the header segment. In such embodiments, the location of the lift cylinder and the pivot may be switched (e.g., the lift cylinder 510 may be disposed at the first end 528, and the pivot 506 may be disposed at the second end 530). Moreover, although the lift cylinder is disposed on the center section with the rod coupled to the second location of the header segment, the lift cylinder may alternatively be disposed on the header segment with the rod coupled to the center section. Further still, certain embodiments may include additional lift cylinders to adjust the position of the header segment. For instance, another lift cylinder may be used instead of the pivot. Accordingly, multiple lift cylinders may be adjusted to raise and lower the header segment.

Figure 5:
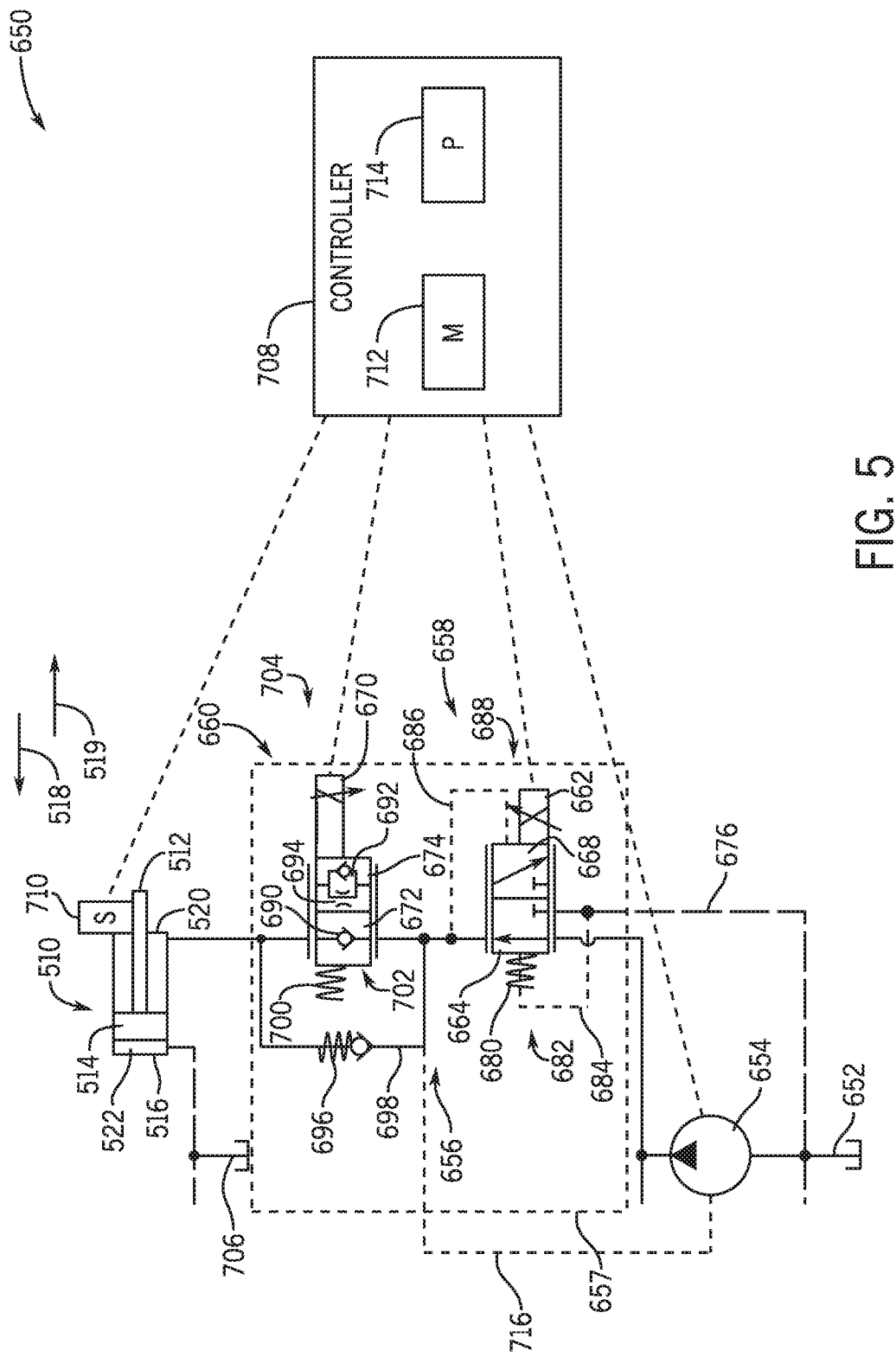
FIG. 5 is a schematic diagram of an embodiment of a hydraulic system that may be employed within the header of FIGS. 3-4, in which the hydraulic system is configured to adjust a position of a header segment, in accordance with an aspect of the present disclosure.

FIG. 5 is a schematic diagram of an embodiment of a hydraulic system 650 that may be employed within the header of FIGS. 2-4, in which the hydraulic system is configured to adjust a position of a header segment. The hydraulic system is configured to add and remove fluid from the first section 520 of the lift cylinder 510. As illustrated in FIG. 5, the hydraulic system 650 includes a first fluid reservoir 652 fluidly coupled to a hydraulic pump 654. The hydraulic pump 654 is configured to direct fluid from the first fluid reservoir 652 to a hydraulic circuit 656 that includes a valve assembly 657 configured to control fluid flow between the first fluid reservoir 652 and the lift cylinder 510. The valve assembly 657 includes a first control valve 658 and a second control valve 660. The first control valve 658 includes a first actuator 662 configured to adjust the first control valve 658 between a first position 664 and a second position 668, and the second control valve 660 includes a second actuator 670 configured to adjust the second control valve 660 between a third position 672 and a fourth position 674. Both the first actuator 662 and the second actuator 670 may be the same or different type(s) of actuator(s). For example, this disclosure primarily discusses the first and second actuators 662, 670 as electromechanical actuators, but the first and second actuators 662, 670 may include a pneumatic actuator, a hydraulic actuator, another suitable actuator, or any combination thereof configured to move the corresponding control valve.

In the illustrated embodiment, the first control valve 658 is a three way, two position valve, in which, in the first position 664 (e.g., an unpowered position), fluid flow is enabled from the hydraulic pump 654 through the first control valve 658 to the second control valve 660. In addition, in the first position 664, fluid flow from the second control valve 660 through the first control valve 658 to the first fluid reservoir 652 is blocked. In the second position 668, fluid flow is enabled from the second control valve 660 through the first control valve 658 and to the first fluid reservoir 652 via a drain line 676. To adjust the first control valve 658 from the first position 664 to the second position 668, the first actuator 662 is activated to exert a force to push the first control valve 658 toward the second position 668. To move the first control valve 658 to the second position 668, the amount of force exerted by the first actuator 662 is greater than a force exerted by a first spring 680 disposed on a first side 682 of the first control valve 658, in which the force exerted by the first spring 680 drives the first control valve 658 toward the first position 664. To adjust the first control valve 658 from the second position 668 to the first position 664, the first actuator 662 is deactivated and the force exerted by the first spring 680 drives the first control valve 658 to the first position 664. Additionally, a pilot line 684 may fluidly connect the drain line 676 to the first side 682. As a result, fluid may be directed from the first fluid reservoir 652 to the first side 682 to drive the first control valve 658 to the first position 664. Furthermore, fluid may be directed from the second control valve 660 to a second side 688 opposite the first side 682 via a second pilot line 686 to drive the first control valve 658 to the second position 668. In this manner, to drive the first control valve 658 to the second position 668, the forces caused by the first actuator 662 and the fluid pressure at the second side 688 via the second pilot line 686 is greater than the forces caused by the spring 680 and the fluid pressure in the first side 682 via the first pilot line 676 and the first drain line 684. Moreover, to drive the first control valve 658 to the first position (i.e., when the first actuator 662 is deactivated), the forces caused by the spring 680 and the fluid pressure in the first side 682 is greater than the forces caused by the fluid pressure in the second side 688.

Turning to the second control valve 660, in the third position 672 of the second control valve 660, fluid flow is enabled from the first control valve 658 through the second control valve 660 to the lift cylinder 510, and fluid flow is blocked from the lift cylinder 510 through the second control valve 660 to the first control valve 658 (e.g., via a first check valve 690). In the fourth position 674, fluid flow is enabled from the lift cylinder 510 through a second check valve 692 of the second control valve 660 to the first control valve 658. In addition, fluid flow is enabled through the second control valve 660 via a flow restrictor 694. In the fourth position 674, fluid flow is also enabled from the first control valve 658 to the lift cylinder 510 via the flow restrictor 694. The flow restrictor 694 may control the amount of fluid flow from the first control valve 658 through the second control valve 660 to the lift cylinder 510 and the amount of fluid flow from the lift cylinder 510 through the second control valve 660 to the first control valve 658. In the illustrated embodiment, a third check valve 696 is disposed on a bypass circuit 698 to enable flow from the first control valve 658 to the lift cylinder 510 regardless of the position of the second control valve 660. Accordingly, fluid flow may bypass the second control valve 660 by flowing through the third check valve 696, regardless of whether the second control valve 660 is in the third position 672 or the fourth position 674. In addition, the third check valve 696 also blocks fluid flow from the lift cylinder 510 from bypassing the second control valve 660.

To adjust the second control valve 660 from the third position 672 to the fourth position 674, the second actuator 670 is activated to exert a force to push the second control valve 660 to the fourth position 674. To move the second control valve 660 to the fourth position 674, the amount of force exerted by the second actuator 670 is greater than a force exerted by a second spring 700 disposed on a third side 702 of the second control valve 660, in which the force exerted by the second spring 700 drives the second control valve 660 toward the third position 672. Specifically, the second actuator 670 may be disposed on a fourth side 704 of the second control valve 660 opposite the third side 702 to drive the second control valve 660 to the fourth position 674. To adjust the second control valve 660 from the fourth position 674 to the third position 672, the second actuator 670 is deactivated and the force exerted by the second spring 700 drives the second control valve 670 to the third position 672.

In the illustrated embodiment, the first control valve 658 and the second control valve 660 are proportional valves. Accordingly, an amount of fluid flow from the first hydraulic source 652 through the first control valve 658 (e.g., in the first position 664) to the second control valve 660 may be controlled by an amount that the first actuator 662 is actuated (e.g., a current input to the first actuator 662). In addition, an amount of fluid flow from the lift cylinder 510 through the second control valve 660 (e.g., in the fourth position 674) to the first control valve 658 may be controlled by an amount that the second actuator 670 is actuated (e.g., a current input to the second actuator 670). The actuation of the respective actuators and the respective amounts of fluid flow may be proportional to one another.

To raise the header segment 502, the piston 514 may be moved in the first piston direction 518 to drive the rod 512 into the body 516. During a raising operation, the first control valve 658 may be moved to the first position 664, and the second control valve 660 may be moved to the third position 672 (i.e., both the first actuator 662 and the second actuator 670 may be unpowered). As such, fluid may flow from the first fluid reservoir 652 through the first position 664 of the first control valve 658, and through the first check valve 690 of the third position 672 of the second control valve 660 and/or the third check valve 696 of the bypass circuit 698, to the first section 520 of the lift cylinder 510. During the raising operation, the second control valve 660 may be in the fourth position 674, and fluid may flow into the lift cylinder 510 from the first control valve 658 through the third check valve 696 of the bypass circuit 698 and the flow restrictor 694. As fluid fills the first section 520, the fluid exerts a force against the piston 514 in the first piston direction 518. When the force exerted against the piston 514 in the first piston direction 518 is greater than the force exerted against the piston 514 in the second piston direction 519, the piston 514 moves in the first piston direction 518 and fluid in the second section 522 transfers to a second fluid reservoir 706. The rate at which the header segment 502 is raised may be based on a rate of fluid flowing into the lift cylinder 510. For example, when the rate of fluid flow into the first section 520 of the lift cylinder 510 increases, the rate that the header segment 502 is raised increases. The rate of fluid flow into the lift cylinder 510 may be controlled by actuation of the first actuator 662 and thus, the first actuator 662 may be controlled to control the rate at which the header segment 502 is raised.

To lower the header segment 502, the piston 514 may be enable to move in the second piston direction 519, such that the rod 512 extends through the body 516. The first control valve 658 may be moved to the second position 668, and the second control valve 660 may be moved to the fourth position 674 (i.e., both the first actuator 662 and the second actuator 670 may be activated). As such, fluid may be enabled to flow from the lift cylinder 510 through the second control valve 660 (e.g., through the second check valve 692 and the flow restrictor 694) and through the first control valve 658 to the first fluid reservoir 652. The fourth position 674 of the second control valve 660 and the second position 668 of the first control valve 658 may drive the piston 514 to move in the second piston direction 519. For example, forces caused by gravity may drive the header segment 502 to lower. Thus, fluid flows from the first section 520 of the lift cylinder 510 through the second control valve 660 and through the first control valve 658 to the first fluid reservoir 652, and fluid fills the second section 522 of the lift cylinder 510 from the second fluid reservoir 706. A rate that the header segment 502 is lowered may be based on a rate that fluid is removed from the first section 520. The rate of fluid flow from the first section 520 may be controlled by actuation of the second control valve 660 and thus, the second actuator 670 may be controlled to control the rate at which the header segment 502 is lowered.

To hold the position of the header segment 502, the second control valve 660 may be moved to the third position 672 and the first control valve 658 may be moved to the second position 668. The first check valve 690 of the second control valve 660 blocks fluid flow from the lift cylinder 510 through the second control valve 660, and the third check valve 696 blocks fluid flow from the lift cylinder 510 through the bypass circuit 698. As such, the amount fluid is substantially maintained downstream of the second control valve 660 (i.e., in the first section 520 of the lift cylinder 510) such that the piston 514 substantially does not move. Thus, the position of the header segment 502 is substantially maintained.

In the illustrated embodiment, the hydraulic system 650 is communicatively coupled to a controller 708 configured to adjust components of the hydraulic system 650. The controller 708 is communicatively coupled to the hydraulic pump 654 and is configured to control operation of the hydraulic pump 654. The controller 708 is also communicatively coupled to the first actuator 662 and/or the second actuator 670 and is configured to control actuation of the first actuator 662 and/or the second actuator 670. The hydraulic system 650 also includes a sensor 710 disposed at the lift cylinder 510. The sensor 710 is communicatively coupled to the controller 708 and configured to output data to the controller 708. For example, the sensor 710 may be a position sensor (e.g., a potentiometer and/or a linear variable differential transformer) configured to detect a position of the rod 512, the piston 514, and/or another parameter of the lift cylinder 510, and/or the sensor 710 may be a pressure sensor configured to detect a pressure within the first section 520. Based on the detected parameter(s), the controller 708 may determine the rate and/or the direction of movement of the header segment 502. A position of the lift cylinder 510 (e.g., a particular position of the piston 514 within the body 516) may be related to a position of the header segment 502 (e.g., a particular angle 534). Based on the detected parameter(s), the controller 708 may determine the position of the header segment 502, the direction of movement of the header segment 508, the rate of movement of the header segment 502, or any combination thereof. Furthermore, a detected pressure in the first section 520 may be related to a rate that the piston 514 is moving and thus, a rate that the position of the header segment 502 is changing. The controller 708 may determine the rate at which the header segment 502 is moving based on the pressure data.

The controller 708 may be configured to control the hydraulic system 650 in different manners. In some embodiments, the controller 708 may be configured to receive an input, such as from an operator of the harvester, to adjust the position of the header segment 502. For example, the operator of the harvester may input a target segment position (e.g., a particular angle 534, a percentage difference between the raised and lowered positions the header segment 502, etc.) and the controller 708 may receive a signal indicative of the input. The controller 708 adjusts the components of the hydraulic system 650 to adjust the flow of fluid into the lift cylinder 510 to adjust the position of the piston 514 and raise or lower the header segment 502. For example, the controller 708 controls the hydraulic pump 654 to direct fluid toward the lift cylinder 510, and the controller 708 deactivates the first actuator 662 to adjust the first control valve 658 to the first position 664. As a result, fluid flow is directed to the lift cylinder 510 to raise the header segment 502. Additionally, the controller 708 activates the first actuator 662 and the second actuator 670 to respectively adjust the first control valve 658 to the second position 668 and to adjust the second control valve 660 to the fourth position 674. As a result, fluid flow is removed from the lift cylinder 510 to lower the header segment 502.

In additional or alternative embodiments, the controller 708 may be configured to automatically adjust the position of the header segment 502. In one example, the controller 708 may be configured to detect other parameters such as a position of the header segment 502 relative to the ground (i.e., cutter height) and/or agricultural crops of the field, and the controller 708 may adjust the position of the header segment 502 based on the cutter height. As an example, the controller 708 may raise and/or lower the header segment 502 to maintain a substantially constant cutter height between the header segment 502 and the ground. That is, if the controller 708 detects the cutter height has decreased below a target cutter height, the controller 708 may raise the header segment 502 to increase the cutter height toward the target cutter height. Likewise, if the controller 708 detects the cutter height has increased above a target cutter height, the controller 708 may lower the header segment 502 to decrease the cutter height toward the target cutter height. In another example, the controller 708 may include a clock configured to measure a time (e.g., a time from a start of operation of the header 112, etc.) and the controller 708 may be configured to adjust the position of the header segment 502 based on the detected time. For example, the header segment 502 may be at a first position during a first block of time (e.g., when the header 112 is cutting a first type of agricultural crop), and the controller 708 may adjust the header segment 502 to be at a second position during a second block of time (e.g., when the header 112 is cutting a second type of agricultural crop).

The controller 708 includes a memory 712 and a processor 714 (e.g., a microprocessor). The memory 712 may include volatile memory such as randomly accessible memory (RAM) and/or non-volatile memory such as hard disc memory, flash memory, and/or other suitable memory formats that contains instructions regarding control of the hydraulic system 650. The processor 714 may be configured to execute the instructions stored in the memory 712 to control the hydraulic system 650. In certain embodiments, there may be multiple controllers 708 communicatively coupled to in the hydraulic system 650. For example, there may be a first controller 708 to control the first control valve 658 and a second controller 708 to control the second control valve 660.

In certain embodiments, in addition to or in place of the controller 708, the hydraulic pump may be configured to direct fluid from the first fluid reservoir 652 based on load sensing. In one example, the hydraulic pump 654 may be configured to maintain a target fluid pressure (e.g., a target fluid differential) of the valve assembly 657. For example, a hydraulic line 716 may enable pressure feedback to the hydraulic pump 654 (e.g., to detect pressure between the first control valve 658 and the second control valve 660). The hydraulic pump 654 may direct fluid through the valve assembly 657 to maintain the pressure feedback within a threshold range of target pressures. As an example, if the pressure feedback is below the threshold range of target pressures, fluid may be directed through the valve assembly 657 to the lift cylinder 510. If the pressure feedback is above the threshold range of target pressures, fluid may be directed from the lift cylinder 510 through the valve assembly 657.

Figure 6:
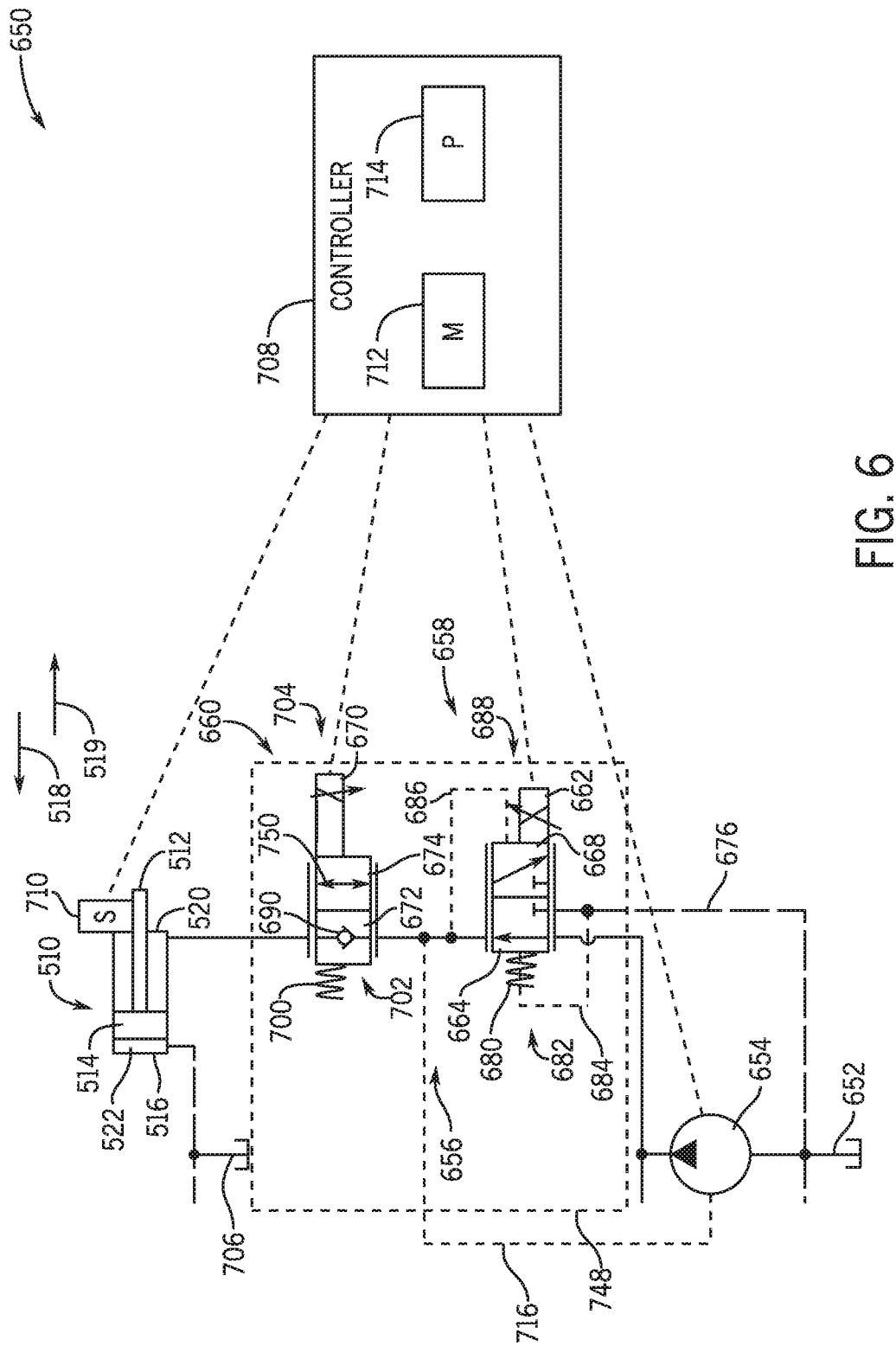
FIG. 6 is a schematic diagram of another embodiment of a hydraulic system that may be employed within the header of FIGS. 3-4, in which the hydraulic system is configured to adjust a position of a header segment, in accordance with an aspect of the present disclosure.

Another embodiment of the hydraulic system 650 is illustrated in FIG. 6, which is a schematic diagram of an embodiment of the hydraulic system 650 with a valve assembly 748 that may be employed within the header of FIGS. 2-4. The illustrated embodiment of the valve assembly 748 does not include the bypass circuit 698 and the third check valve 696. The second control valve 660 of the valve assembly 748 includes the first check valve 690 in the third position 672 configured to direct fluid from the first control valve 658 through the second control valve 660 to the lift cylinder 510 and to block fluid flow from the lift cylinder 510 through the second control valve 660 to the first control valve 658. However, the fourth position 674 of the second control valve 660 includes a two way valve 750 that enables flow in either direction through the second control valve 660. In other words, when the second control valve 660 is in the fourth position 674, fluid may flow from the lift cylinder 510 through the second control valve 660 to the first control valve 658 or from the first control valve 658 through the second control valve 660 to the lift cylinder 510. In some embodiments, fluid flow through the second control valve 660 is proportional when the second control valve 660 is moved to the fourth position 674. That is, the amount of fluid flow through the second control valve 660 may be controlled by the amount that the second actuator 670 is actuated.

Raising and/or lowering the header segment 502 may be performed similarly to that of the hydraulic system 650 depicted in FIG. 5. That is, to raise the header segment 502, the first control valve 658 is moved to the first position 664 to enable fluid flow from the first fluid reservoir 652 through the first control valve 658 to the second control valve 660. Additionally, the second control valve 660 may be in either the third position 672 or the fourth position 674. That is, since fluid flow is enabled from the first control valve 658 through the first check valve 690 of the second control valve 660 (i.e., in the third position 672 of the second control valve 660) to the lift cylinder 510 and also from the first control valve 658 through the two way valve 750 of the second control valve 660 (i.e., in the fourth position 674 of the second control valve 660), the second control valve 660 may be moved to either the third position 672 or the fourth position 674. As such, fluid may flow from the first fluid reservoir 652 through the first control valve 658 and the second control valve 660 to the first section 520 of the lift cylinder 510. The rate at which the header segment 502 is raised may be based on a rate that fluid is added into the first section 520. The rate of fluid flow into the first section 520 may be controlled by the actuation of the first actuator 662 to control the rate of fluid flow through the first control valve 658 and/or by the actuation of the second actuator 670 to control the rate of fluid flow through the second control valve 660. Thus, the first actuator 662 and/or the second actuator 670 may be controlled to control the rate at which the header segment 502 is raised.

To lower the header segment 502, the first control valve 658 is moved to the second position 668 and the second control valve 660 is moved to the fourth position 674. As such, fluid flow is enabled from the lift cylinder 510 through the two way valve 750 of the second control valve 660 and through the first control valve 658 into the first fluid reservoir 652. As a result, fluid flows from the lift cylinder 510 through the second control valve 660 and the first control valve 658 to the first fluid reservoir. The fourth position 674 of the second control valve 660 and the second position 668 of the first control valve 658 may drive the piston 514 to move in the second piston direction 519. As an example, forces caused by gravity may drive the header segment 502 to lower and as a result, fluid flows from the first section 520 of the lift cylinder 510 through the second control valve 660 and through the first control valve 658 to the first fluid reservoir 652, while fluid fills the second section 522 of the lift cylinder 510 from the second fluid reservoir 706. A rate at which the header segment 502 is lowered is based on a rate that fluid is removed from the first section 520. The rate of fluid flow from the first section 520 may be controlled by the actuation of the first actuator 662 to control the rate of fluid flow through the first control valve 658 and/or by the actuation of the second actuator 670 to control the rate of fluid flow through the second control valve 660. Thus, the first actuator 662 and/or the second actuator 670 may be controlled to control the rate at which the header segment 502 is lowered.

Holding the position of the header segment 502 includes moving the second control valve 660 to the third position 672. In this manner, fluid flow is blocked from the lift cylinder 510 through the second control valve 660 via the first check valve 690. Thus, the amount of fluid is substantially maintained downstream of the second valve 660 (i.e., in the first section 520 of the lift cylinder) such that the position of the piston 514 substantially does not move and the position of the header segment 502 is substantially maintained. The hydraulic system 650 of FIG. 6 also includes the controller 708 to facilitate raising, lowering, and/or holding of the position of the header segment 502. Specifically, the controller 708 is communicatively coupled to the hydraulic pump 654 and is configured to control operation of the hydraulic pump 654. Additionally, the controller 708 is communicatively coupled to the first actuator 662 and/or the second actuator 670 and is configured to control actuation of the first actuator 662 and/or the second actuator 670 to adjust a position of the header segment 502 and/or a rate at which the position of the header segment 502 is adjusted. The controller 708 may control the hydraulic pump 654, the first actuator 662, and/or the second actuator 670 based on a received input (e.g., from an operator of the header 112 and/or the sensor 710). It should also be appreciated that the hydraulic system 650 includes the hydraulic line 716 to enable the hydraulic pump to direct fluid from the first fluid reservoir 652 based on load sensing, as described in FIG. 5 above.

The embodiments of the hydraulic system 650 of FIGS. 5 and 6 are depicted as adding and removing fluid in a single lift cylinder, but in additional or alternative embodiments, the hydraulic system may be configured to add and/or remove fluid from multiple lift cylinders. By way of example, the header may include multiple header segments coupled to the center section. A hydraulic system may include a first hydraulic circuit that is configured to add and remove fluid from a lift cylinder coupled to one of the header segments (e.g., the first header segment 212), and the same hydraulic system may include a second hydraulic circuit that is configured to add and remove fluid from a different lift cylinder coupled to the other header segment (e.g., the second header segment 214). The hydraulic circuits may use the same or different valve assembly to add and/or remove fluid from the respective lift cylinders. For example, the first hydraulic circuit may use the embodiment of the valve assembly depicted in FIG. 5, and the second hydraulic circuit may use the embodiment of the valve assemblies depicted in FIG. 6. In certain embodiments, the header may include several hydraulic systems, in which each hydraulic system is configured to control a respective lift cylinder to move one or more header segments. In such aforementioned embodiments, the header segments may be controlled independently of one another. For example, the header segment may be set at different positions and/or may be adjusted at different rates. For example, the first header segment 212 may be raised while the second header segment 214 may be lowered.

There may be other embodiments of the hydraulic system that may be utilized to adjust the position of the header segment. Indeed, other suitable hydraulic systems, such as modifications to the valve assemblies depicted in FIGS. 5 and 6, may be used to adjust the position of the header segment. For example, additional or alternative embodiments of the hydraulic system may additionally or alternatively be configured to add and/or remove fluid from the second section. Indeed, in certain embodiments, more than one hydraulic circuit may be configured to add and/or remove fluid from the same lift cylinder. Moreover, certain embodiments may include components not depicted in FIG. 5 or 6. That is, additional control valves may be disposed in the hydraulic circuit, other types of control valve may be used (e.g., control valves with more than two positions and/or control valves with configurations different than depicted), and additional components to facilitate operation of the hydraulic system (e.g., breathers, filters, accumulators, additional sensors) may be utilized. As an example, the second section 522 may additionally or alternatively be coupled to a component to enable air to flow in and/or out of the second section 522. In some embodiments, the second section 522 may be coupled to a small air filter to enable air to flow in and out of the second section 522, while blocking debris from entering the lift cylinder 510. In another embodiment, the second section 522 may be coupled to a check valve that enables air to flow out of the second section 522, but blocks air from entering the second section 522. In such embodiments, there may also be a filter disposed to block debris from also flowing into the second section 522. Additionally, angle sensors (e.g., gyroscope, etc.) configured to detect angular position may be additionally or alternatively utilized to determine a position of a header segment based on an angle of the header segment (e.g., with respect to the center section). Other modifications of the hydraulic system may also be made, such as consolidating the first fluid reservoir and the second fluid reservoir into the same fluid reservoir.

Figure 7:
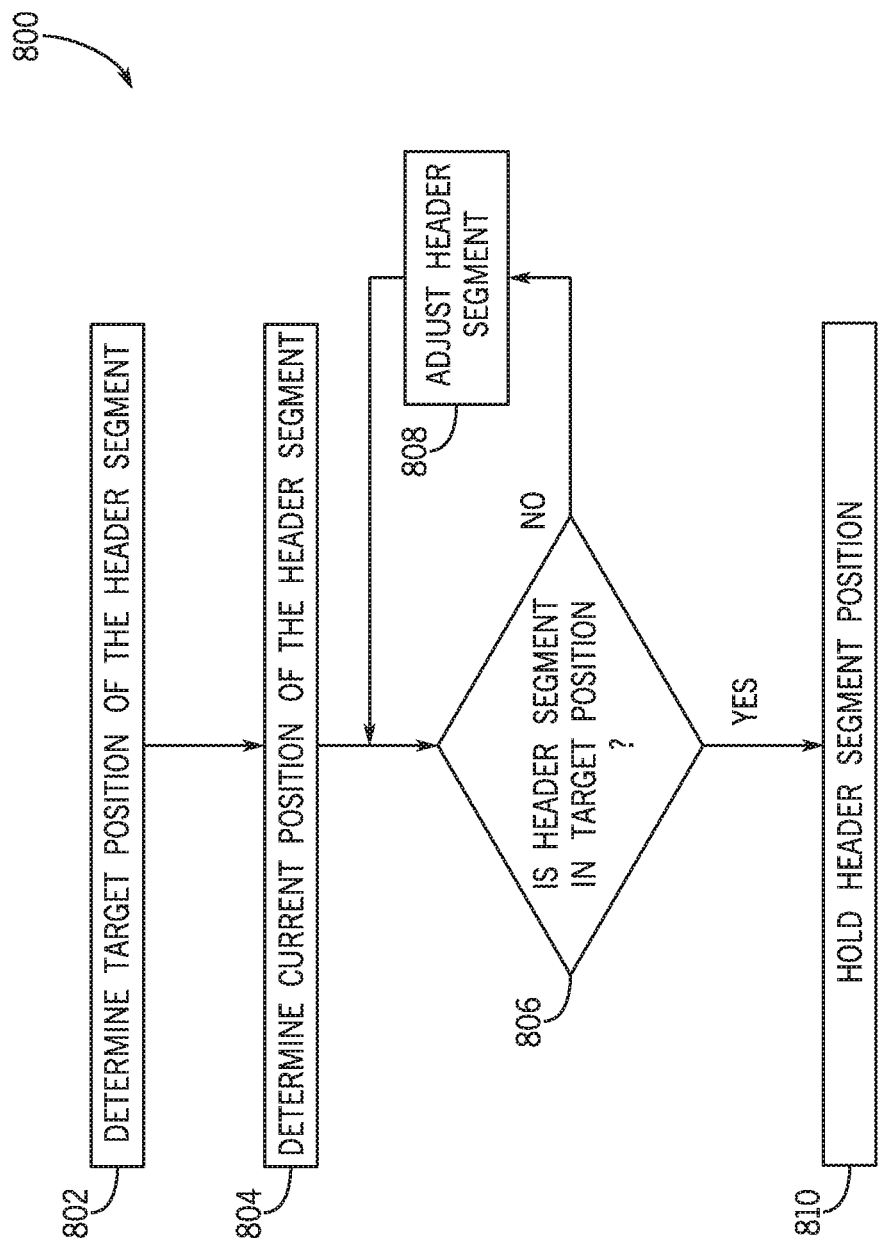
FIG. 7 is a flowchart of an embodiment of a method to adjust a position of a header segment, in accordance with an aspect of the present disclosure.

FIG. 7 is a flow chart of an embodiment of a method 800 to adjust a header segment, which may be utilized by any of the systems illustrated in FIGS. 1-6. The steps of the method 800 may be performed by the controller 708 upon loading and executing software code or instructions, which may be tangibly stored on a tangible computer readable medium, such as on the memory 712, which may be a magnetic medium, e.g., a computer hard drive, an optical medium, e.g., an optical disc, solid-state memory, e.g., flash memory, or other storage media known in the art. Thus, any of the functionality performed by the controller 708 described herein, such as the method 800, is configured in software code or instructions, which are tangibly stored on a tangible computer readable medium. The controller 708 may load the software code or instructions via a direct interface with the computer readable medium or via a wired and/or wireless network. Upon loading and executing such software code or instructions by the controller 708, the controller 708 may perform any of the functionality of the controller 708 described herein, including any steps of the method 800 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

In block 802, a target position of the header segment is determined. For example, a first signal is received, in which the first signal is indicative of a target position, such as relative to a range of motion of the header segment relative to the center section, relative to another header segment, relative to another component of the header and/or the harvester, relative to the ground, relative to any other suitable component, or any combination thereof. As previously discussed, the first signal may be transmitted via an input from an operator of the harvester. For example, the operator may use a user interface of the harvester to indicate the target position of the header segment. The first signal may also be transmitted via other inputs, including inputs in response to parameters detected via a sensor of the harvester, such as to maintain a desire cutting height between the header segment and the ground. In any case, such inputs may be received by the controller and processed by the processor.

In some embodiments, the controller may determine the target position as a percentage of a range of motion of the header segment. For instance, the header segment may rotate between a maximum position (e.g., when the header segment is fully raised) and a minimum position setpoint (e.g., when the header segment is fully lowered). Thus, 100 percent position may indicate a fully raised position and 0 percent position may indicate a fully lowered position. The header segment may be adjustable between 0 percent and 100 percent. In this manner, the controller may use the received signal to determine a percentage corresponding to the target position. In additional or alternative embodiments, the controller may determine the position setpoint as an angle, such as relative to the center section. Thus, the header segment may be adjustable between a range of angles and use the first signal to determine an angle corresponding to the target position.

After the first signal is received, the controller may determine a current position of the header segment, as depicted in block 804. For example, the controller may receive a second signal indicative of the current position of the header segment. The second signal may be received from sensors utilized by the header. In block 806, the controller may compare the first signal with the second signal to compare the current position with the target position. In this manner, the controller determines if the header segment is positioned in the target position to determine if the header segment is to be adjusted. If the header segment is not in the target position, the header segment may be adjusted, as indicated in block 808. Specifically, the hydraulic system may be adjusted to adjust the header segment to the target position. Adjusting the hydraulic system may include determining whether the header segment is to be raised (e.g., the target position is higher than the current position) or lowered (e.g., the target position is lower than the current position).

In response to determining the direction that the header segment is to be adjusted, the hydraulic system may be controlled accordingly. For example, the position of the first control valve and/or the position of the second control valve may be adjusted to control the position of the header segment. Adjusting the hydraulic system may also be based on a target rate of adjusting the header segment. For example, the first control valve and/or the second control valve may be controlled to control an amount of fluid flow through the control valve(s), thereby controlling the rate of header segment movement. In some embodiments, the rate may be included in the first signal indicative of the target position. In additional or alternative embodiments, the rate may be determined based on the comparison between the target position and the current position.

In response to the hydraulic system being in the appropriate configuration, the piston moves to adjust the position of the header segment. While the position of the header segment adjusts, the controller may continuously determine whether the position of the header segment substantially corresponds to the target position and accordingly, may continue to adjust the position of the header segment. In certain embodiments, if the position of the header segment is determined to be within a threshold value (e.g., a deadband range) of the target position, the controller may instruct the control valves to terminate adjustment of the header segment. In other words, the controller may adjust the position of the header segment until the controller determines that the current position of the header segment is within a predetermined value of the target position. In some embodiments, the controller may instruct the control valve(s) to terminate adjustment of the header segment within a range of positions. For example, if the target position is 50 percent, the controller may instruct the control valve(s) to terminate adjustment of the header segment when the position of the header segment is between 45 percent and 55 percent. The range may not be exactly centered around the position setpoint. That is, for example, instead of 45 percent to 55 percent for a target position setpoint of 50 percent, the controller may instruct the control valve(s) to terminate adjustment of the header segment at positions between 47 percent and 55 percent.

When the position of the header segment is determined to be substantially at the target position, the position of the header segment may be held, as indicated in block 810. For example, the controller may instruct the respective actuator(s) to position the control valve(s) such that fluid is substantially maintained in the first section of the lift cylinder and the position of the piston and the header segment is substantially maintained. The position of the header segment may be held until another signal is received indicating a different target position of the header segment or when the header segment moves out of the deadband range.

Additional steps not already described in FIG. 7 may be performed, such as intermediate steps between certain blocks, steps performed before block 802, and/or steps performed after block 810. Further, certain steps may be performed in a different order than described in FIG. 7. For example, the steps of block 804 may be performed prior to the steps of block 802. Further still, certain steps of the method 800 may be performed simultaneously rather than sequentially. Modifications of certain steps of the method 800 may also be made, so long as the modified steps are still able to appropriately adjust the position of the header segment.

While only certain features of the disclosure have been illustrated and described herein, many modifications and changes will occur to those skilled in the art. It is, therefore, to be understood that the appended claims are intended to cover all such modifications and changes as fall within the essence of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A header of a harvester, comprising:
   a header segment comprising a cutter bar configured to cut crops, a first portion of a conveyor assembly, and a wheel configured to engage a ground;
   a center section comprising a second portion of the conveyor assembly, wherein the center section is configured to receive cut crops from the header segment via the first portion of the conveyor assembly, the second portion of the conveyor assembly is configured to transport the received cut crops to a crop processing system of the harvester, and the wheel is configured to control a position of the header segment relative to the center section while the header is in a lowered position;
   an actuator coupling the header segment to the center section;
   a sensor configured to output a sensor signal indicative of a measured position of the header segment relative to the center section; and
   a controller comprising a processor and a memory, wherein the controller, while the header is in a raised position, is configured to:
      receive a target signal indicative of a target position of the header segment relative to the center section; and
      control the actuator based at least in part on the measured position and the target position to adjust the header segment to the target position.

2. The header of claim 1, wherein the controller is further configured to determine a difference between the measured position and the target position, and wherein the controller is configured to control the actuator to adjust the header segment to the target position in response to determining the difference between the measured position and the target position exceeds a threshold value.

3. The header of claim 1, wherein the actuator comprises a hydraulic cylinder coupled to a hydraulic circuit, and the controller is configured to control the hydraulic circuit to control the hydraulic cylinder.

4. The header of claim 1, wherein the target signal indicative of the target position of the header segment is received from a user interface.

5. The header of claim 1, further comprising an additional header segment and an additional actuator coupling the additional header segment to the center section, wherein the controller, while the header is in the raised position, is further configured to receive an additional target signal indicative of an additional target position of the additional header segment and to control the additional actuator to adjust the additional header segment to the additional target position.

6. A header of a harvester, comprising:
   a header segment comprising a cutter bar configured to cut crops, and a wheel configured to engage a ground;
   a center section configured to receive the cut crops from the header segment via a conveyor assembly, wherein the wheel is configured to control a position of the header segment relative to the center section while the header is in a lowered position;
   a hydraulic system comprising a hydraulic cylinder coupled to the header segment and to the center section, and a valve assembly in fluid communication with the hydraulic cylinder, wherein the valve assembly is configured to control extension of the hydraulic cylinder to adjust the header segment;
   a sensor configured to output a sensor signal indicative of a measured position of the header segment relative to the center section; and
   a controller communicatively coupled to the valve assembly, wherein the controller comprises a processor and a memory, and the controller, while the header is in a raised position, is configured to:
      receive a target signal indicative of a target position of the header segment relative to the center section; and
      control the valve assembly based at least in part on the measured position and the target position to adjust the header segment to the target position.

7. The header of claim 6, wherein the hydraulic cylinder has a first section configured to receive fluid from a first fluid source, and a second section configured to receive the fluid from a second fluid source.

8. The header of claim 7, wherein the valve assembly is fluidly coupled to the first section of the hydraulic cylinder, and wherein the valve assembly is configured to:
   direct the fluid from the first fluid source to the first section to retract the hydraulic cylinder; and
   enable the fluid to flow from the first section to the first fluid source to enable the hydraulic cylinder to extend.

9. The header of claim 7, wherein the valve assembly comprises a first control valve and a second control valve, the first control valve is configured to control fluid flow between the second control valve and the first fluid source, and the second control valve is configured to control fluid flow between the hydraulic cylinder and the first control valve.

10. The header of claim 9, wherein the first control valve has a first position configured to enable fluid to flow from the first fluid source to the second control valve, and the first control valve further has a second position configured to enable the fluid to flow from the second control valve to the first fluid source; and
   wherein the second control valve has a third position configured to block the fluid from flowing from the hydraulic cylinder to the first control valve, and the second control valve further has a fourth position configured to enable the fluid to flow from the hydraulic cylinder to the first control valve.

11. The header of claim 10, wherein the controller is further configured to instruct an actuator of the first control valve to transition the first control valve to the first position to raise the header segment.

12. The header of claim 10, wherein the controller is further configured to:
   instruct a first actuator of the first control valve to transition the first control valve to the second position; and
   instruct a second actuator of the second control valve to transition the second control valve to the fourth position to lower the header segment.

13. A header of a harvester, comprising:
   a header segment comprising a cutter bar configured to cut crops, and a wheel configured to engage a ground;
   a center section configured to receive the cut crops from the header segment via a conveyor assembly, wherein the wheel is configured to control a position of the header segment relative to the center section while the header is in a lowered position;

a hydraulic system comprising a hydraulic cylinder coupling the center section to a first location of the header segment, and a valve assembly in fluid communication with the hydraulic cylinder, wherein the valve assembly is configured to control extension of the hydraulic cylinder;

a pivot rotatably coupling the center section to a second location of the header segment;

a sensor configured to output a sensor signal indicative of a measured position of the header segment relative to the center section; and a controller communicatively coupled to the valve assembly, wherein the controller comprises a processor and a memory, and the controller, while the header is in a raised position, is configured to:

receive a target signal indicative of a target position of the header segment relative to the center section; and control the valve assembly based at least in part on the measured position and the target position to rotate the header segment about the pivot to the target position.

14. The header of claim 13, wherein the controller is further configured to determine a difference between the measured position and the target position, and the controller is configured to control the valve assembly to adjust the header segment in response to determining the difference exceeds a threshold value.

15. The header of claim 13, wherein the valve assembly is further configured to direct a fluid to the hydraulic cylinder to retract the hydraulic cylinder to enable the fluid to flow from the hydraulic cylinder to enable the hydraulic cylinder to extend, and wherein the valve assembly comprises:

a first control valve configured to control fluid flow between the second control valve and a fluid source; and a second control valve configured to control fluid flow between the hydraulic cylinder and the first control valve.

16. The header of claim 13, wherein the first location is above the second location relative to the ground.

17. The header of claim 13, wherein the controller is further configured to:

instruct the valve assembly to retract the hydraulic cylinder to raise the header segment; and instruct the valve assembly to extend the hydraulic cylinder to lower the header segment.

* * * * *